(12) United States Patent  (10) Patent No.: US 9,007,321 B2
Adachi  (45) Date of Patent: Apr. 14, 2015

(54) METHOD AND APPARATUS FOR ENLARGING A DISPLAY AREA

(71) Applicant: Sony Corporation, Minato-ku (JP)

(72) Inventor: Hiroaki Adachi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/850,005

(22) Filed: Mar. 25, 2013

(65) Prior Publication Data

US 2014/0285418 A1  Sep. 25, 2014

(51) Int. Cl.
*G09G 5/00* (2006.01)
*G06F 3/01* (2006.01)
*G06F 3/0488* (2013.01)

(52) U.S. Cl.
CPC ............ *G06F 3/013* (2013.01); *G06F 3/04886* (2013.01)

(58) Field of Classification Search
CPC ................... G06F 3/041–3/047; G06F 3/048; G06F 3/0484; G06F 3/04845; G06F 3/0488; G06F 3/04886; G06F 2203/04805; G06F 2203/04806
USPC ...................... 345/173, 174, 175; 348/E5.055
See application file for complete search history.

(56) References Cited

U.S. PATENT DOCUMENTS

| | | | | |
|---|---|---|---|---|
| 2009/0327977 | A1* | 12/2009 | Bachfischer et al. | 715/863 |
| 2010/0177121 | A1* | 7/2010 | Homma et al. | 345/659 |
| 2011/0109771 | A1* | 5/2011 | Onomura | 348/240.3 |
| 2011/0285657 | A1* | 11/2011 | Shimotani et al. | 345/173 |
| 2012/0056989 | A1* | 3/2012 | Izumi | 348/46 |

FOREIGN PATENT DOCUMENTS

JP  2009-151646  7/2009

* cited by examiner

*Primary Examiner* — Tom Sheng
(74) *Attorney, Agent, or Firm* — Oblon, McClelland, Maier & Neustadt, L.L.P.

(57) ABSTRACT

An apparatus may include circuitry configured to determine, as a first determination result based on an output of a sensor, that an instruction object is within a predetermined distance of a surface of a display. The circuitry may acquire an image of an area surrounding the apparatus. The circuitry may detect a presence of a facial feature in the captured image. The circuitry may calculate a line-of-sight angle based on the detected facial feature. The circuitry may control the display to enlarge an area of a displayed interface based on the first determination result and the line-of-sight calculation.

14 Claims, 9 Drawing Sheets

METHOD AND APPARATUS FOR ENLARGING A DISPLAY AREA

BACKGROUND

1. Technical Field

The present disclosure relates to a method and apparatus for displaying an enlarged display area. In particular, the present disclosure relates to a method and apparatus for determining a size of a display area based on a proximity detection and features of a captured image.

2. Description of Related Art

Recent mobile devices, such as smartphones, may include a virtual keyboard for performing input operations (e.g., text entry). In particular, a mobile device may display a virtual keyboard on its display screen such that a user may perform input operations by touching the virtual keyboard with an instruction object, such as a finger or stylus. For example, a mobile device may include features for detecting when the instruction object makes contact with the display surface of the mobile device. Moreover, a mobile device may include features for detecting when the instruction object is within a predetermined distance of the display surface (referred hereinafter as a "proximity detection"). In response to detecting an instruction object contacting the display surface and/or being within a predetermined proximity of the display surface, the mobile device may include features for determining an area/coordinate of the display surface that corresponds to the position at which the mobile device display surface is touched and/or the position at which a proximity detection occurs. Based on the determined position of the touch operation and/or the proximity detection, the mobile device may, e.g., determine that a corresponding character of the virtual keyboard has been touched, and the determined character may be used in subsequent processing (e.g., text display, Web search, text messaging, etc.).

Virtual keyboards on many recent mobile devices may display character keys on a relatively small area, such as a screen smaller than a typical user's hand. Consequently, the dimensions of each key displayed on the virtual keyboard are typically narrow and therefore, unintended operations frequently occur where a user inadvertently touches a virtual keyboard key that is displayed adjacent to the key that the user intends to touch. As one technology intended to solve the problem of unintentional virtual keyboard key operations, there exists a technology that enlarges a display area corresponding to an area at which a proximity detection occurs. By enlarging an area of the displayed virtual keyboard, the key that the user intends to touch may become more prominent because it is displayed in a larger size, thereby reducing the likelihood of an unintentional input operation.

SUMMARY

Because mobile devices, such as smartphones, typically display data on relatively small screens, a problem exists where an instruction object, such as a user's finger, may obscure data that a user intends to touch during an input operation. For example, in the case of a virtual keyboard, a user's finger may obscure a plurality of keys as the user's finger approaches the screen, thereby making it difficult to determine which key will be input by the user when the display screen is touched and increasing the likelihood that an adjacent key will be unintentionally contacted during the touch operation. Moreover, data may be obscured by an input instrument regardless of whether an area of the displayed data is enlarged by separate processing (e.g., following a proximity detection).

In light of the above, the present disclosure describes a method and apparatus for enlarging a display area such that the displayed data is not obscured by the input instrument.

In one embodiment of the present disclosure, an apparatus may include circuitry configured to determine, as a first determination result based on an output of a sensor, that an instruction object is within a predetermined distance of a surface of a display. The circuitry may acquire an image of an area surrounding the apparatus. The circuitry may detect a presence of a facial feature in the captured image. The circuitry may calculate a line-of-sight angle based on the detected facial feature. The circuitry may control the display to enlarge an area of a displayed interface based on the first determination result and the line-of-sight calculation.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
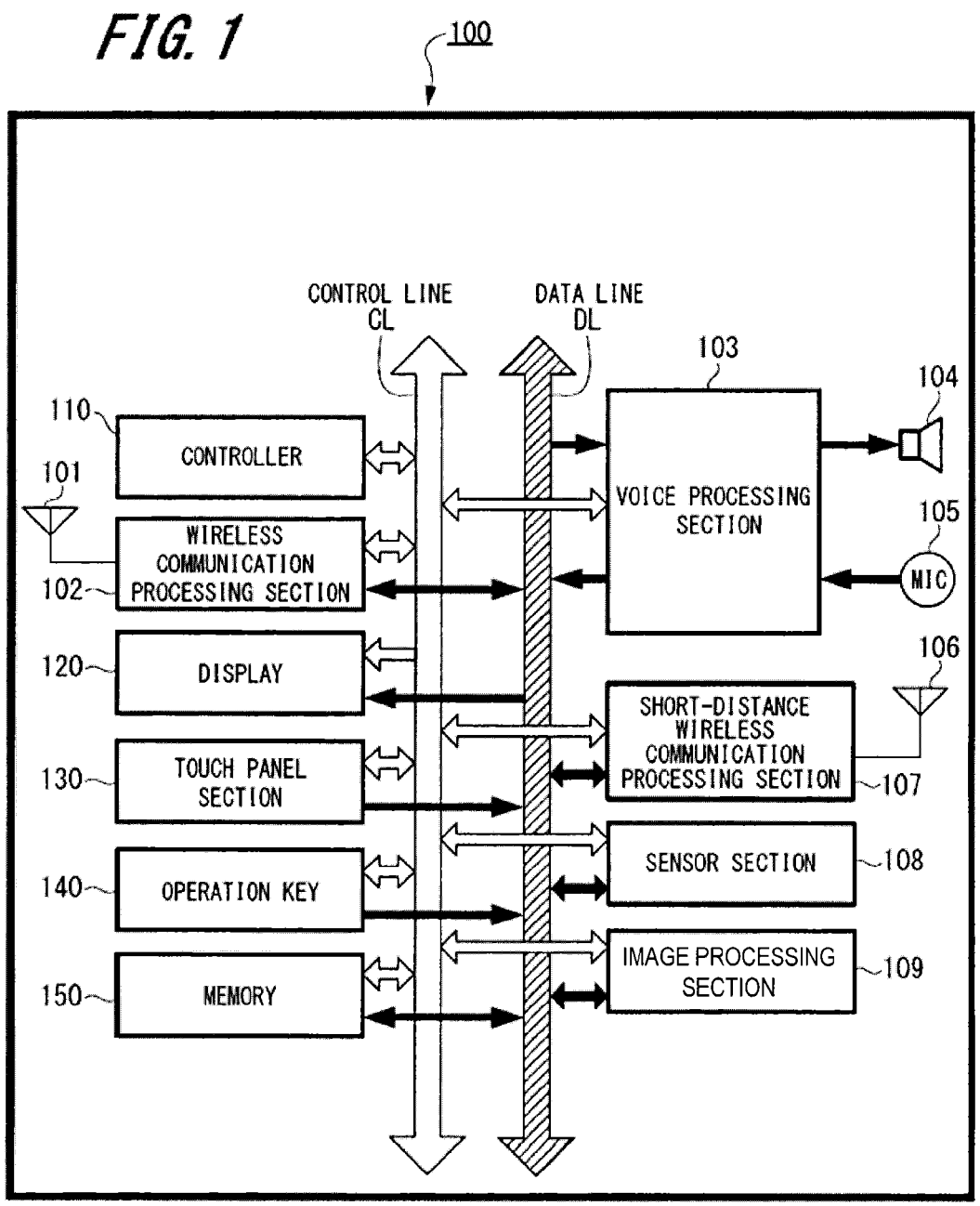
FIG. 1 illustrates a schematic block diagram of an exemplary mobile device.

Referring now to the drawings, wherein like reference numerals designate identical or corresponding parts throughout the several views.

FIG. 1 illustrates a schematic block diagram of an exemplary mobile device 100. As shown in FIG. 1, the mobile device 100 may include an antenna 101 and a wireless communication processing section 102. The wireless communication processing section 102 may communicate wirelessly via radio signals, or the like, with other mobile devices via, e.g., a base station. Further, a data signal, such as a voice transmission from another user, may be received by antenna 101 and sent to the wireless communication processing section 102 for further processing. In the case of an incoming voice transmission, the voice data signal may be sent from the wireless communication processing section 102 to a voice processing section 103. Incoming voice data received by the voice processing section 103 via the wireless communication processing section 102 may be output as sound via a speaker 104.

Conversely, an outgoing voice signal may be supplied by a user to the voice processing section 103 via a microphone 105. The voice signal received via the microphone 105 and processed by the voice processing section 103 may be sent to the wireless communication processing section 102 for transmission by the antenna 101.

A second antenna 106 may be supplied for use with a short-distance wireless communication processing section 107. The short-distance wireless communication processing section 107 may communicate wirelessly with other devices over a network, such as the Internet, a local area network (LAN), or a wide area network (WAN). The second antenna 106 may, e.g., be a Wi-Fi transceiver.

An image processing section 109 may photograph an area surrounding the mobile device 100. The image processing section 109 may include a plurality of cameras, and may capture still and/or moving images. For example, the image processing section 109 may include a front and/or rear-facing camera on the mobile device 100. Moreover, a controller 110 may receive an input from the image processing section 109 to perform aspects of features related to enlarging data on a display 120. For example, the controller 110 may enlarge a portion of a virtual keyboard displayed on the display 120, where the enlargement is based on features of an image captured by the image processing section 109.

The display 120 may be, e.g., a liquid crystal display (LCD) panel, an organic electroluminescent (OLED) display panel, a plasma display panel, or the like. The display 120 may, e.g., display text, an image, a web page, a video, or the like. For example, when the mobile device 100 connects with the Internet, the display 120 may display text and/or image data that is transmitted from a web server in Hyper Text Markup Language (HTML) format and displayed via a web browser. The display 120 may additionally display data stored in a memory 150.

A touch panel section 130 may detect a touch operation on the surface of the display 120. For example, the touch panel 130 may detect a touch operation performed by an instruction object, such as a finger or stylus. Touch operations may correspond to user inputs, such as a selection of a character displayed on the display 120. The touch panel section 130 may be an electrostatic capacitance type device, a resistive type touch panel device, or other such type devices for detecting a touch on a display panel.

The touch panel section 130 may perform processing related to touch operation classification. For example, the touch panel section 130 may assign a predetermined function to be performed when a "tap" touch operation is detected. Similarly, the touch panel section may analyze a touch operation in which the instruction object makes continuous contact with the display 120 while moving the instruction object around the display 120 (e.g., a "swipe" operation). The touch panel section 130 may output a signal based on a classification of the touch operation performed. The signal may, e.g., include information indicating the touch operation classification, the location on the display 120 where the touch operation was performed, and the operation to be performed based on the touch operation.

A sensor section 108 may be provided for the mobile device 100. The sensor section 108 may include a motion sensor that detects a motion of an object in the proximity of the mobile device 100. The motion may correspond to a user moving an instruction object, such as a finger or stylus, in the proximity of the mobile device 100 for the purpose of selecting data displayed on display 120. For example, the sensor section 108 may detect when an instruction object is "close" (e.g., within 1 cm) to the surface of the display 120. Proximity detection performance (e.g., distance of detection) may be adjusted by the sensor section 108 by varying the sensitivity of detecting the instruction object. The sensor section 108 may provide an input (e.g., a coordinate) to the controller 110 corresponding to a position on the display 120 at which the instruction object is approaching in close proximity. In a non-limiting example, the controller 110 may, in response to receiving an input indicating a position on the display 120 at which an instruction object is approaching in close proximity, control the display 120 to enlarge a portion of data displayed on the display 120 at the corresponding position. For example, the controller 110 may control the display 120 to enlarge a portion of a virtual keyboard, where the enlarged portion of the virtual keyboard corresponds to a position of the instruction object in close proximity to the display 120.

An operation key 140 may receive inputs, e.g., from external control buttons included with the mobile device 100. The external control buttons may, e.g., control the volume, the power, or a hold operation for the mobile device 100.

Data that is detected and processed by the various sections of the mobile device 100 may be transmitted to the controller 110. The controller 110 may execute instructions stored in the memory 150. To this end, the memory 150 may be a non-transitory computer readable medium having instructions stored therein for controlling aspects of the mobile device 100. Further, the controller 110 may include one or more processors for executing the instructions stored on the memory 150. In one aspect, the controller 110 may utilize classification tables and/or character string tables stored in the memory 150 in executing instructions for the mobile device 100. However, the processing features of the controller 110 are not limited to using such tables, and other methods of performing these features may be utilized.

The mobile device 100 can include a control line CL and a data line DL as internal bus lines for communication. The control line CL can be used to transmit control data to/from the controller 110. The data line DL may be used for the transmission of voice data, display data, or the like, throughout the various elements of the mobile device 100.

Figure 2:
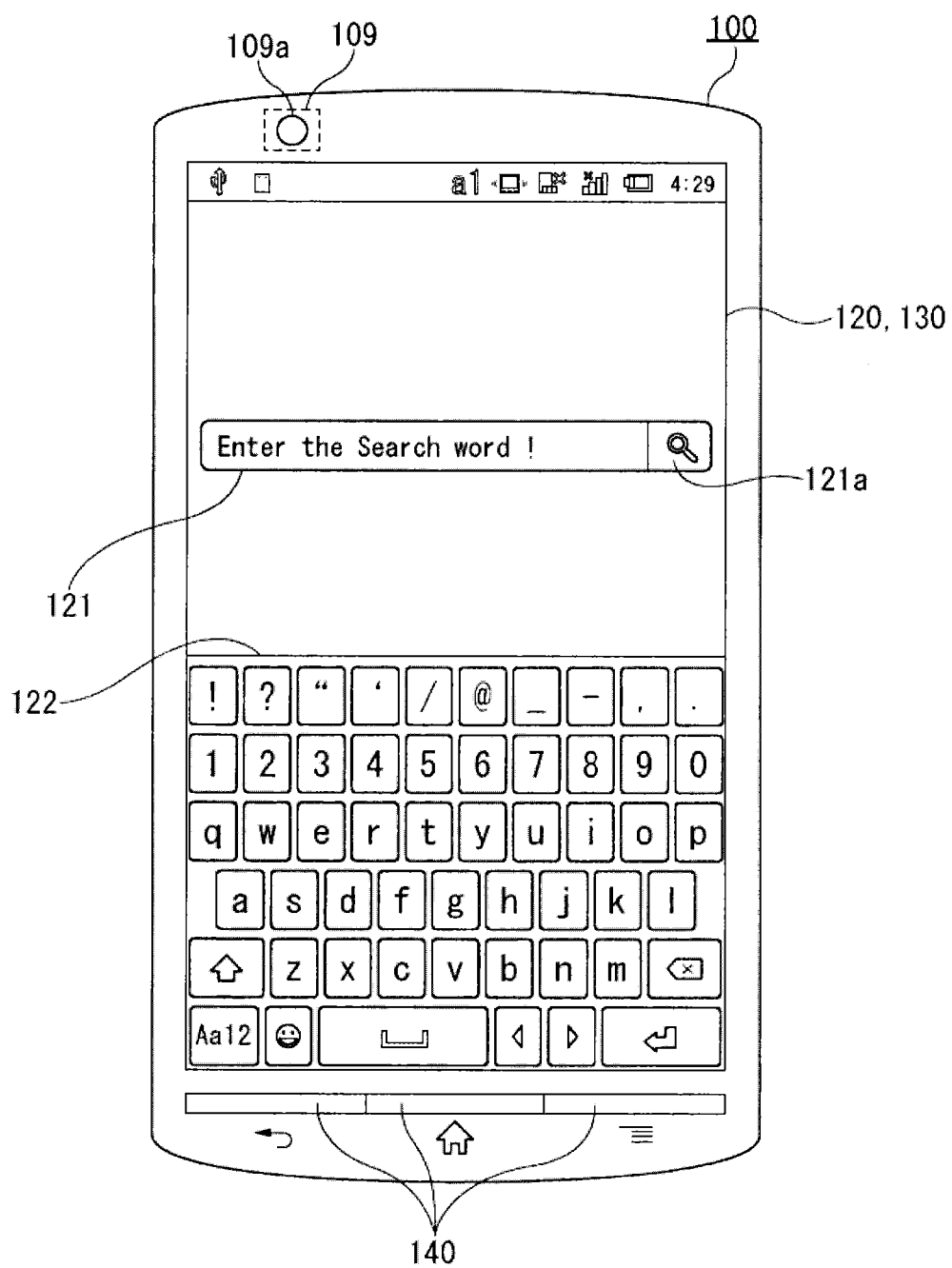
FIG. 2 illustrates a non-limiting example of structural features of an exemplary mobile device.

Next, FIG. 2 provides a non-limiting example of structural features of the mobile device 100. Referring to FIG. 2, the display 120 may be formed on a surface of the mobile device 100. Aspects of the touch panel section 130 may be formed integrally with the display 120. The display 120 is of a comparatively small size with respect to larger display devices, such as a computer monitor. Functional keys corresponding to the operation key 140 are arranged at a lower section of the mobile device 100. It should be appreciated that the operation key 140 location shown in FIG. 2 is provided merely for illustrative purposes, and the operation key 140 may be located at other sections of the mobile device 100, such as on a side edge. Further, operation key functions corresponding to the operation key 140 may be integrated as virtual keys displayed on the display 120.

The image processing section 109 may be arranged at an upper section of the mobile device 100. The image processing section 109 may include a lens 109a for capturing image data. In the non-limiting example of FIG. 2, the image processing section 109 and the lens 109a may photograph an area in front of the display 120. However, it should be appreciated that the location of the image processing section 109 in this non-limiting example may be altered such that other areas surrounding the mobile device 100 may be photographed. Further, additional lenses and/or image processing sections may be arranged on the mobile device 100 such that a plurality of areas surrounding the mobile device 100 may be photographed.

An exemplary virtual keyboard 122 is displayed on the display 120. The exemplary keyboard 122 includes a plurality of alphanumeric characters and symbols, as well as functional keys, such as directional arrows for changing a cursor position. The display area of the virtual keyboard 122 is typically small for many mobile devices, thereby increasing the possibility that an unintended operation of characters displayed on the virtual keyboard 122 may occur. Moreover, should the instruction object used to perform touch input operations be of relatively large size with respect to the virtual keyboard 122 keys, some of the virtual keyboard 122 keys may be obscured from view by the instruction object. It should be appreciated that the character arrangement and exemplary keys shown in the virtual keyboard 122 are not limiting, and the present disclosure may easily be adapted such that other keys and/or arrangements are used for the keyboard 122.

The virtual keyboard 122 may be used to perform data entry functions for the mobile device 100. In particular, the sensor section 108 and/or the touch panel section 130 may be used in conjunction with the virtual keyboard 122 to allow a user to select keys on the virtual keyboard 122 by touching the display 120 with an instruction object. In response to detecting that an instruction object has contacted the display 120 in an area corresponding to the virtual keyboard 122, the touch panel section 130 may identify a coordinate corresponding to the character on the virtual keyboard 122 that was touched by the instruction object. The identified character within the virtual keyboard 122 may then be used to perform subsequent processing, such as text entry into an input area. As a non-limiting example, characters selected by a touch operation with an instruction object on the keyboard 122 may be displayed in a search area 121 following the touch operation. That is, in response to the touch panel 130 detecting a touch operation on the virtual keyboard 122, the touch panel 130 identifies a character corresponding to the touch operation, and displays the identified character within the search area 121. The process of identifying a character following a touch operation and displaying the character as a character string in the search area 121 may continue as long as touch operations continue to be detected by the touch panel section 130. In this non-limiting example, once a user has entered all characters corresponding to a desired character string via the virtual keyboard 122 and the touch panel section 130 detection, the entered character string may be displayed in the search area 121, and the user may then search for the entered character string by touching the search instruction key 121a shown on the display 120. In response to the touch panel section 130 detecting a touch operation corresponding to the search function key 121a, the controller 110 may carry out a search, such as a keyword search performed on an Internet search engine.

FIG. 2 illustrates a case in which an instruction object is not approaching the display 120. That is, the example of FIG. 2 does not illustrate an instruction object that may obstruct a portion of the display 120 such that data displayed on the display 120 cannot be seen from a user's perspective. Further, a relative size difference between an instruction object and the keys displayed on the virtual keyboard 122 is not shown in FIG. 2; however, it should be appreciated that instruction objects, such as a user's finger, are often a much greater size than keys shown in the virtual keyboard 122, thereby resulting in adjacent keys frequently being contacted during an input operation to the virtual keyboard 122. To address issues resulting from size discrepancies between the instruction object and the virtual keyboard 122 keys, aspects of the present disclosure may be adapted such that a portion of the virtual keyboard 122 is enlarged in response to a proximity detection of the instruction object near the surface of the display 120. Moreover, to address issues arising due to an instruction object obscuring data (even enlarged areas) on the display 120, aspects of the present disclosure may determine an area of the displayed data to be enlarged based on features of a captured image.

Figure 3:
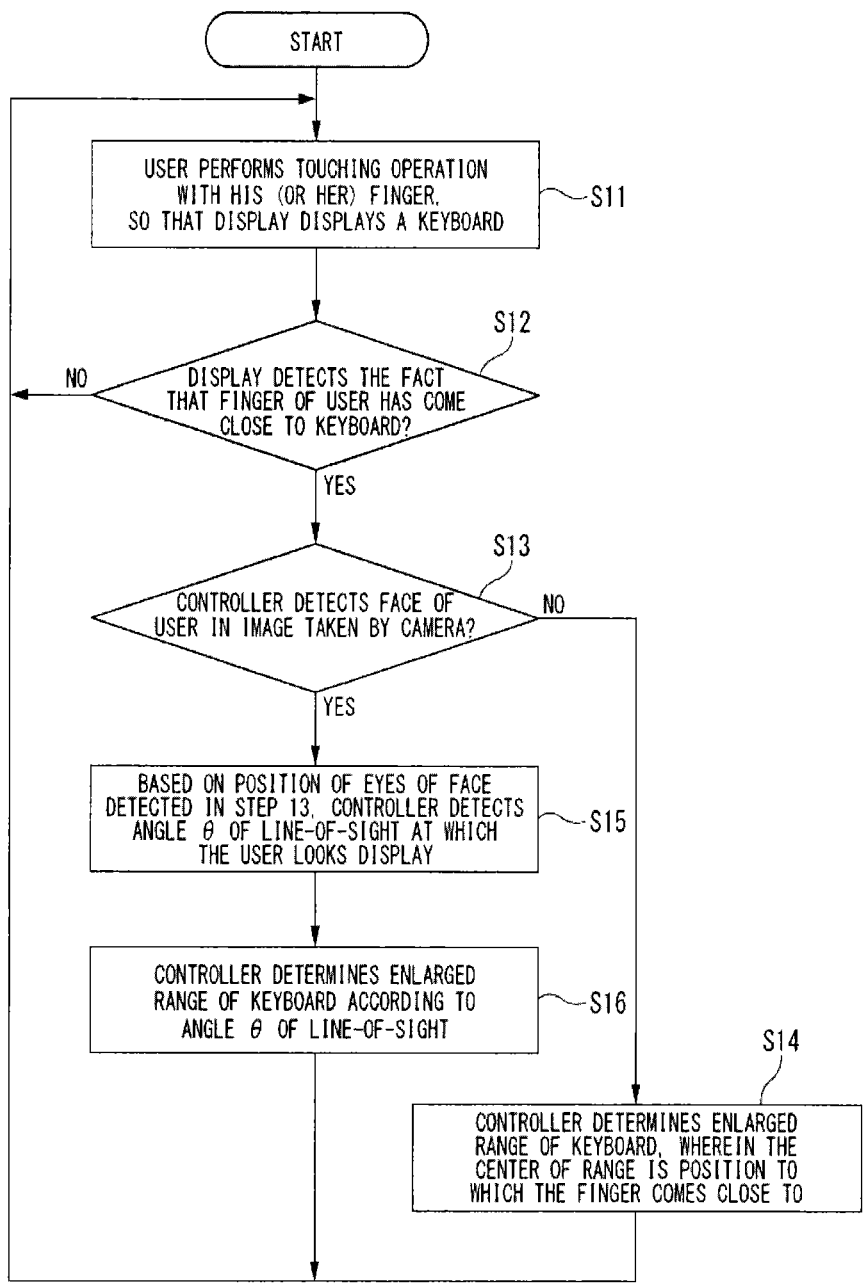
FIG. 3 illustrates an exemplary flow chart for determining an enlarged display area.

FIG. 3 illustrates an exemplary flow chart for determining an enlarged display area based on a proximity detection and features of a captured image. For illustration purposes, the instruction object described with respect to the example of FIG. 3 is assumed to be a user's finger. Further, the enlarged area in the example of FIG. 3 corresponds to a virtual keyboard on a mobile device; however, it should be appreciated that other areas of a display may be enlarged, and the present disclosure is not limited to mobile devices.

Referring now to FIG. 3, a virtual keyboard is displayed on the mobile device at step S11 in response to a user touching the mobile device display with his or her finger. At step S12, the controller 110 detects when the user's finger comes within a predetermined distance of the display 120. The predetermined distance may be zero (i.e., the instruction object may be contacting the display), or another non-zero distance from the display surface. The detection at step S12 may include determining whether the user's finger is within the predetermined distance for a predetermined time.

If the controller 110 determines that the user's finger is within the predetermined distance of the display 120, the controller 110 at step S13 detects whether a face of a user is detected from an image taken by the image processing section 109. The image may be captured simultaneously with the determination at step S13, or may be an image stored in memory or received from other sources. Further, the image may be a moving image that is previously captured or taken in real-time.

If a face is not detected at step S13, the controller 110 determines an area of the displayed virtual keyboard to enlarge based on a corresponding position of the user's finger in close proximity to the display 120. For example, the controller 110 may enlarge one or more keys of the displayed virtual keyboard, where a coordinate corresponding to the proximity detection corresponds to the center position of the enlarged area.

Otherwise, if a face is detected at step S13, the controller 110 at step S15 detects the presence of eyes in the face image, and determines an angle corresponding to a line-of-sight from the detected eyes to the mobile device 100. The line-of-sight angle may, e.g., be determined based on a position of the detected eyes relative to the detected face and/or relative to each other. Further, image processing may be performed to analyze features of the detected eyes, such as a position of the iris, pupil, etc., to determine the line-of-sight angle.

At step S16, the controller 110 determines a portion of the virtual keyboard to enlarge, based on the calculated line-of sight angle corresponding to the user's line-of-sight to the mobile device 100. For example, based on the calculated line-of-sight angle, a portion of the virtual keyboard that is enlarged may be determined such that a center of the enlarged area is offset from a position corresponding to the user's finger in close proximity to the display 120. That is, unlike the case described for step S14, step S16 may not result in a portion of the display virtual keyboard being enlarged such that the center of the enlarged portion corresponds to the position at which a proximity detection occurs.

Figure 4:
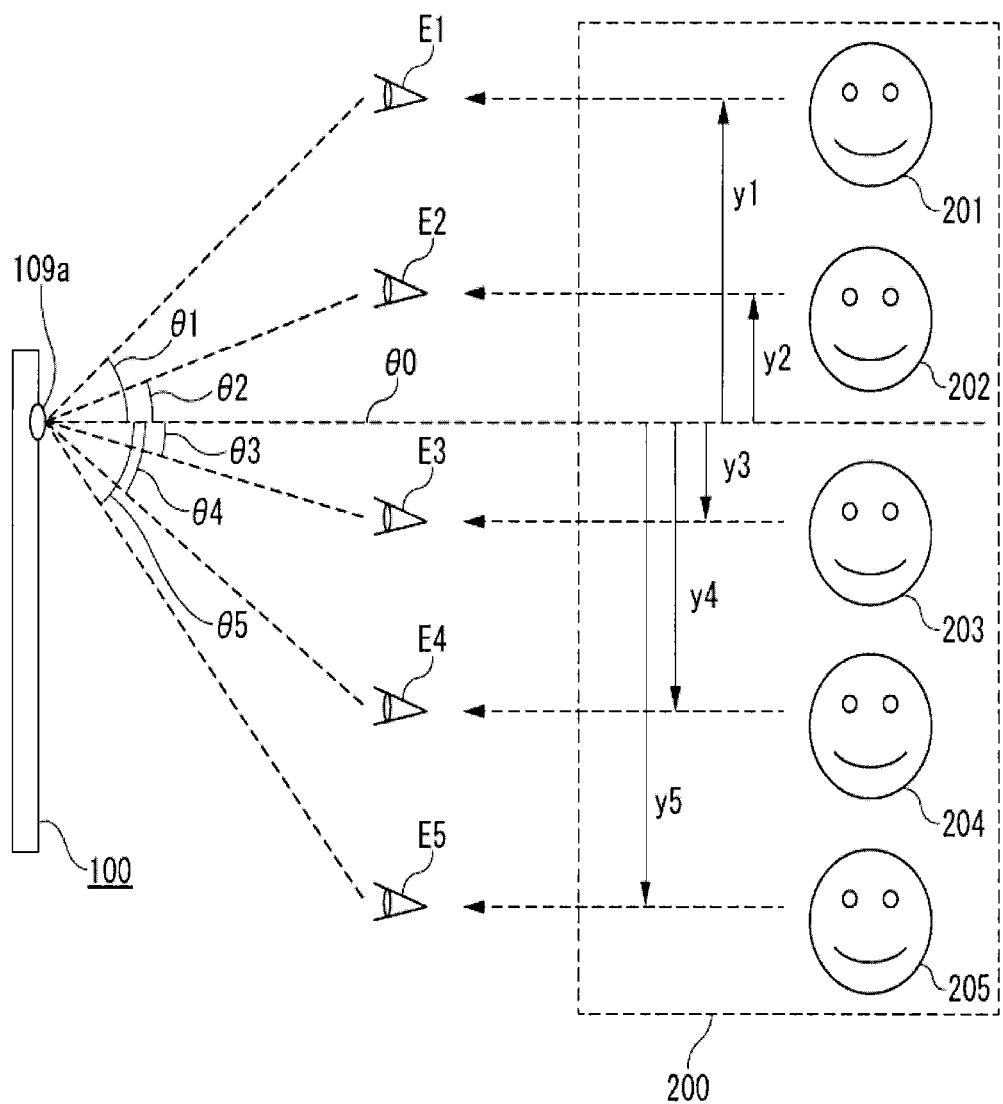
FIG. 4 illustrates a non-limiting example of determining a line-of-sight angle.

Next, FIG. 4 provides a non-limiting example of determining a line-of-sight angle based on features of a captured image. Referring to FIG. 4, since the lens 109a is mounted on a front surface of the mobile device 100, images of a user may be captured when the user is facing the front surface of mobile device 100. That is, when a user holds the mobile device 100 at a predetermined distance relative to the user's face, an image of the user's face may be captured by the image processing section 109. Image processing may be performed on the captured image to detect, e.g., the user's face and/or a plurality of faces within the image. For example, image processing may detect a face as a whole or a particular feature thereof. As a non-limiting example of detecting facial features, the image processing may detect facial features such as an eye, a nose, or a mouth. The image processing may also determine orientation aspects of the detected face by, e.g., analyzing the facial features with regard to distance, relative angle, and/or color changes. For example, the image processing may detect an orientation of a face by analyzing the distance at which the detected face's eyes are separated and/or color changes in the detected eyes.

In the example of FIG. 4, faces 201, 202, 203, 204, and 205 provide non-limiting examples of facial orientations that may be detected within a range 200 of the mobile device 100. FIG. 4 illustrates eyes E1, E2, E3, E4, and E5, which respectively correspond to the faces 201-205. Taking face 201 as exemplary, an image of the face 201 may be captured by the image processing section 109 via the lens 109a. At a time at which the image of the face 201 is captured, the user corresponding to the face 201 may, e.g., be holding the mobile device 100 at a distance y1 below the user's face 201. Distance y1 may be measured from a predetermined reference position/angle (e.g., a reference vector corresponding to $\theta 0$) with respect to the mobile device 100. The controller 110 of the mobile device 100 may detect an eye or eyes E1 corresponding to the face 201, and determine that the eye E1 is at an angle $\theta 1$ relative to the lens 109a. For example, the face 201 may be detected, and the position of eye E1 may be determined based on the distance y1 at which the eye E1 is offset from the reference position. Accordingly, the angle $\theta 1$ may be determined based on geometric relationships. Line-of-sight angles $\theta 2$-$\theta 5$ may be determined by a similar process.

Figure 5:
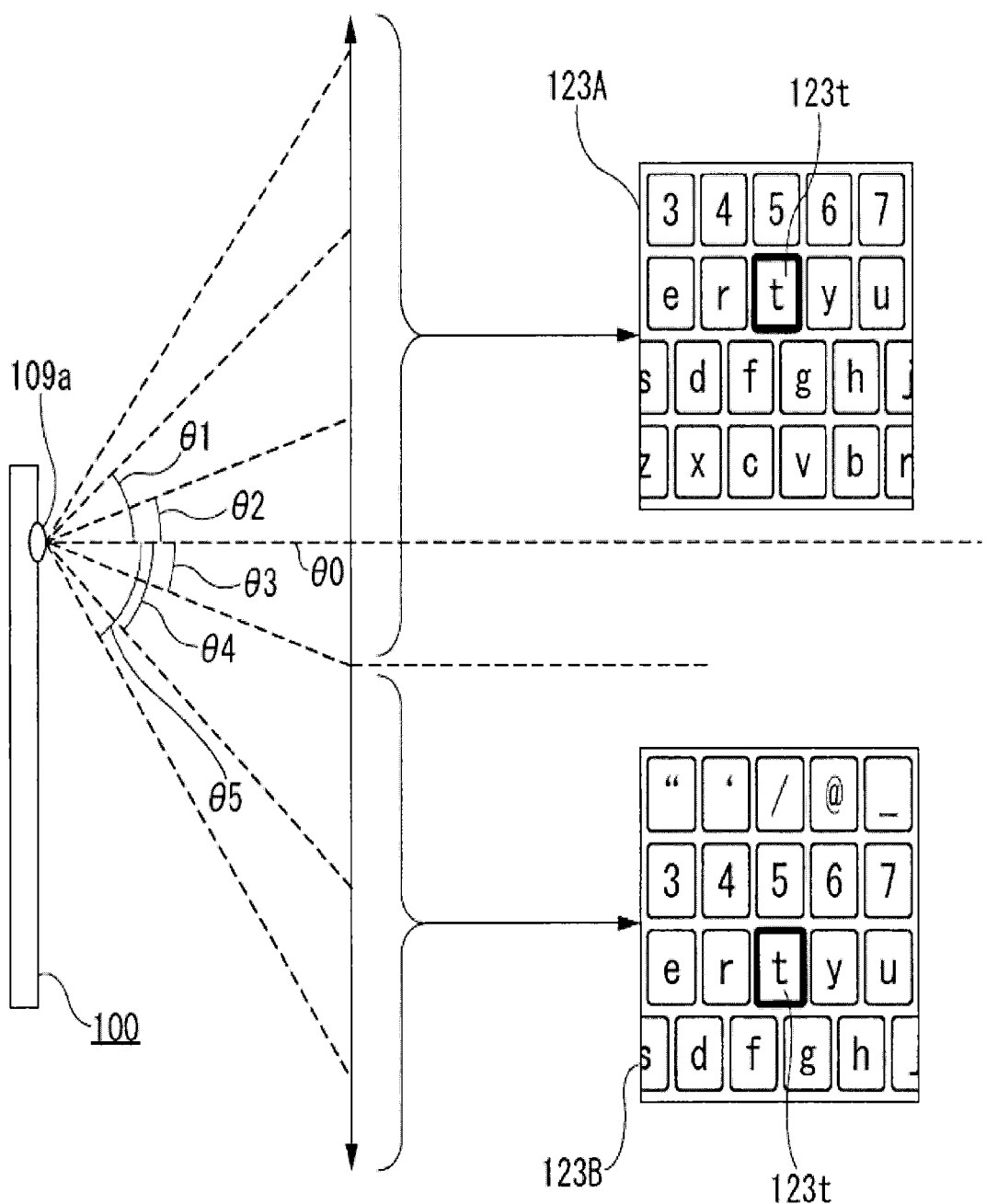
FIG. 5 illustrates a non-limiting example of enlarging a display area based on a line-of-sight angle calculated based on features of a captured image.

Next, FIG. 5 provides a non-limiting example of enlarging a display area based on a line-of-sight angle detected in a captured image. The example shown in FIG. 5 assumes that an instruction object (e.g., a finger) approaches an area on a virtual keyboard displayed on the display 120 corresponding to a character "t", which is labeled as character 123t. Line-of-sight angle $\theta 3$ is assumed to be a reference angle for the purposes of FIG. 5.

In response to detecting that the instruction object is approaching within a predetermined distance from the display 120, the controller 110 of the mobile device 100 may enlarge an area of the displayed data based on the determined line-of-sight angle. For example, the controller 110 may enlarge an area of a virtual keyboard. The example of FIG. 5 shows an enlarged area 123A corresponding to line-of-sight angles $\theta 1$ and $\theta 2$, and an enlarged area 123B corresponding to a line-of-sight angles $\theta 4$ and $\theta 5$. That is, when line-of-sight angles $\theta 1$ and $\theta 2$ are calculated based on features of a captured image, the controller 110 displays the enlarged area 123A. Similarly, when the line-of-sight angles $\theta 4$ or $\theta 5$ are calculated based on features of a captured image, the controller 110 displays the enlarged area 123B.

Enlarging a display area based merely on the proximity detection of an instruction object, such as a user's finger, typically results in the enlarged area being centered on the corresponding position at which the proximity detection occurs. In the example of FIG. 5, this would result in an enlarged display area being centered on the character 123t. However, determining an enlarged display area based on a line-of-sight angle, such as in the examples shown in FIG. 5, provides the advantage of displaying an enlarged area that is offset from the position at which the proximity detection occurs such that portions of the enlarged area are not obscured by the presence of the instruction object when viewed from a perspective corresponding to the line-of-sight angle. For example, rather than centering the character 123t within the enlarged area 123A, the controller 110 may determine, based on calculating line-of-sight angle $\theta 1$ or $\theta 2$, that a single row of horizontal keys should be displayed above the character 123t and two rows of horizontal keys should be displayed below the character 123t. Similarly, the controller 110 may determine, based on calculating line-of-sight angle $\theta 4$ or $\theta 5$, that two sets of horizontal keys should be displayed above the character 123t and one set of horizontal keys should be displayed below the character 123t in the enlarged area 123B.

Figure 6:
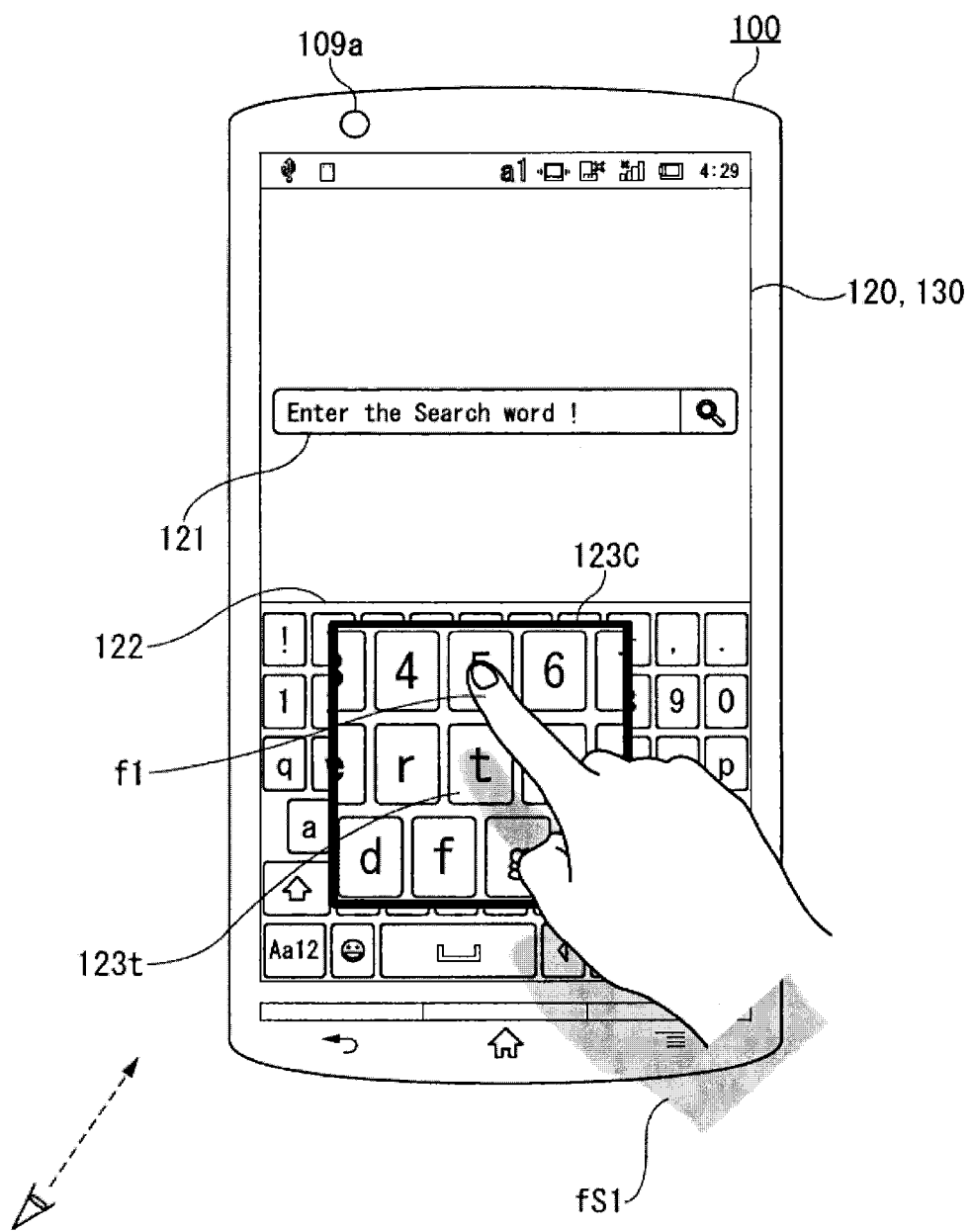
FIG. 6 illustrates a non-limiting example of enlarging data displayed on a mobile device display without adjusting the enlarged area based on a line-of-sight angle.

Next, FIG. 6 provides a non-limiting example of enlarging a display area without detecting a line-of-sight angle (e.g., step S14 of FIG. 3). Referring to FIG. 6, the display 120 includes the virtual keyboard 122, and is in a state in which the user's finger f1 is approaching the character 123t within a predetermined proximity. The proximity detection results in an enlarged area 123C being displayed. The enlarged area 123C corresponds to a portion of the virtual keyboard 122 that includes the character 123t. Moreover, because processing related to enlarging a display area in the example of FIG. 6 does not include determining a line-of-sight angle from a captured image, the enlarged area 123C is substantially centered at the character 123t.

It is assumed that for the purposes of the example in FIG. 6, the mobile device 100 is viewed from an upward slanting perspective, resulting in the shadow fs1 and the user's finger f1 obscuring a portion of the enlarged area 123C. That is, the user is assumed to be holding/viewing the mobile device 100 at an upward slant such that the user is looking upward at the mobile device 100. The shadow fS1 is cast as a result of light shining perpendicular to the display 120 and striking the user's finger f1. As FIG. 6 illustrates, the shadow fS1 and the relative size of the finger f1 with respect to the enlarged area 123C hinders a user's ability to accurately perform a touch operation on the intended virtual keyboard key because the keys are obscured.

Figure 7B:
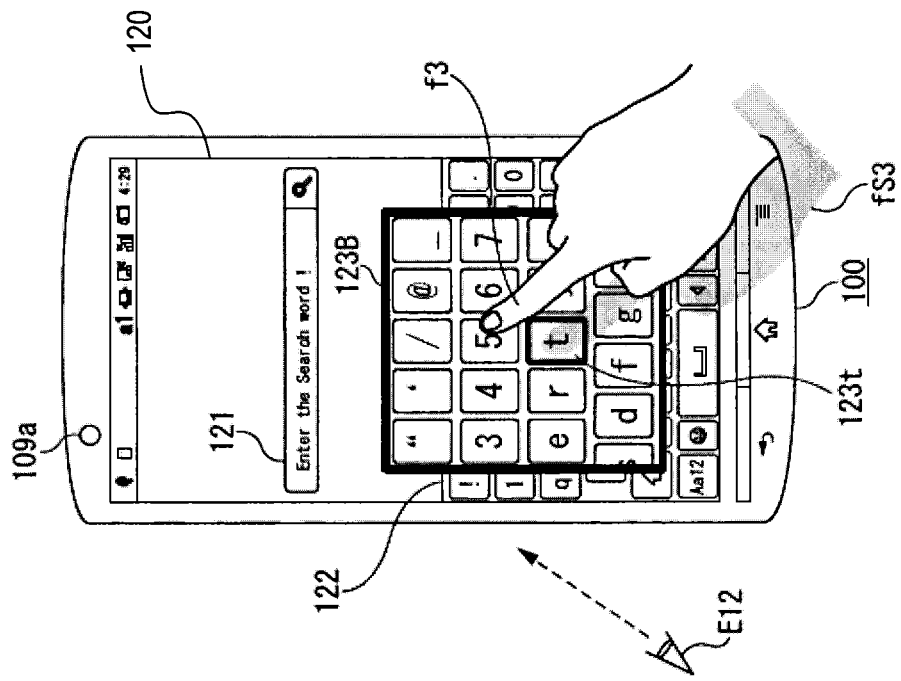
FIGS. 7A and 7B provide non-limiting examples of determining an enlarged display area based on a line-of-sight angle detected in a captured image.
Figure 7A:
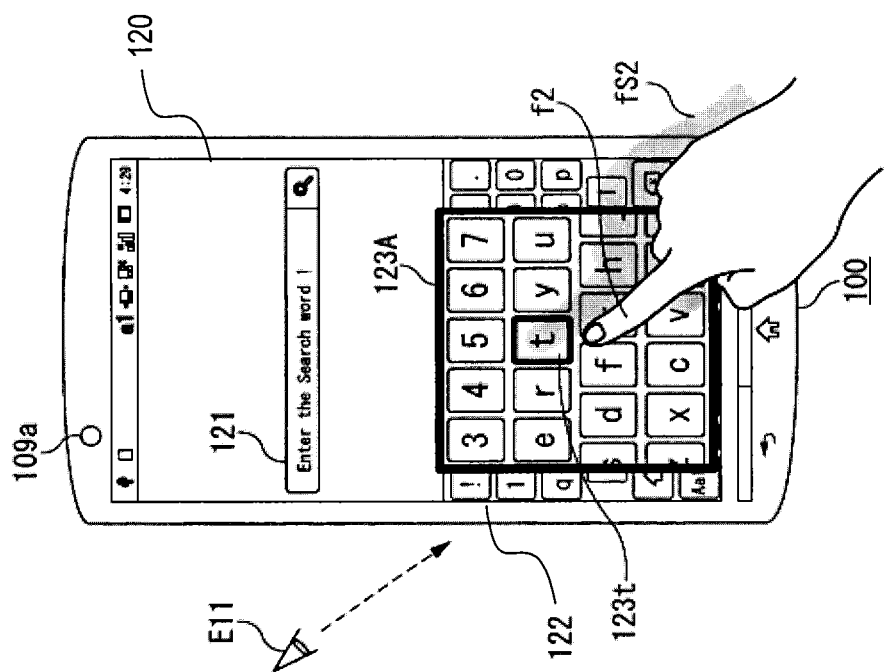

Next, FIGS. 7A and 7B provide non-limiting examples of determining an enlarged display area based on a line-of-sight angle calculated based on features of a captured image. Referring first to FIG. 7A, a user's finger f2 is shown approaching the character 123t displayed on the virtual keyboard 122. The example of FIG. 7A is shown from the perspective of eye E11. Further, it is assumed that light is incident upon the surface of the mobile device 100 at a perpendicular angle resulting in shadow sS2 being cast on the mobile device 100. An image may be captured in the example of FIG. 7A by the lens 109a. The captured image may, e.g., include a face that is detected by the controller 110. The controller 110 may also detect the presence of the eye E11 in the face. Based on the detection of the presence of eye E11, a line-of-sight angle from the eye E11 to the mobile device 100 may be calculated. For example, the controller 110 may determine the line-of-sight angle of E11 to the mobile device 100 corresponds to the line-of-sight angle $\theta 1$ shown in FIGS. 4 and 5. In response to detecting the presence of the finger f2 within a predetermined proximity of the character 123t and the calculation of the line-of-sight angle corresponding to the eye E11, the controller 110 may generate an enlarged area 123A for display on the display 120. The determined line-of-sight angle of eye E11 in FIG. 7A results in the character 123t being shifted slightly above the position at which the proximity detection occurs. As a result, the shifted character 123t within the enlarged area 123A allows a user looking at the mobile device 100 from the perspective of eye E11 to visually see the character 123t rather than the character being obscured by the finger f2.

Similarly, referring to FIG. 7B, a detection of finger f3 within a predetermined proximity of the character 123t and a calculation of a line-of-sight angle corresponding to eye E12 detected in a captured image results in an enlarged area 123B being displayed. The line-of-sight angle calculated in the example of FIG. 7B may correspond to line-of-sight angle θ5 of FIGS. 4 and 5. The enlarged area 123B illustrates the character 123t being shifted to a position slightly below the position at which the proximity detection occurs, based on the detection of the line-of-sight angle corresponding to eye E12. The shifting of the character 123t downward within the enlarged area 123B ensures the user may view the character 123B without the character being obscured by the finger f3 from the perspective of the eye E12.

Figure 8:
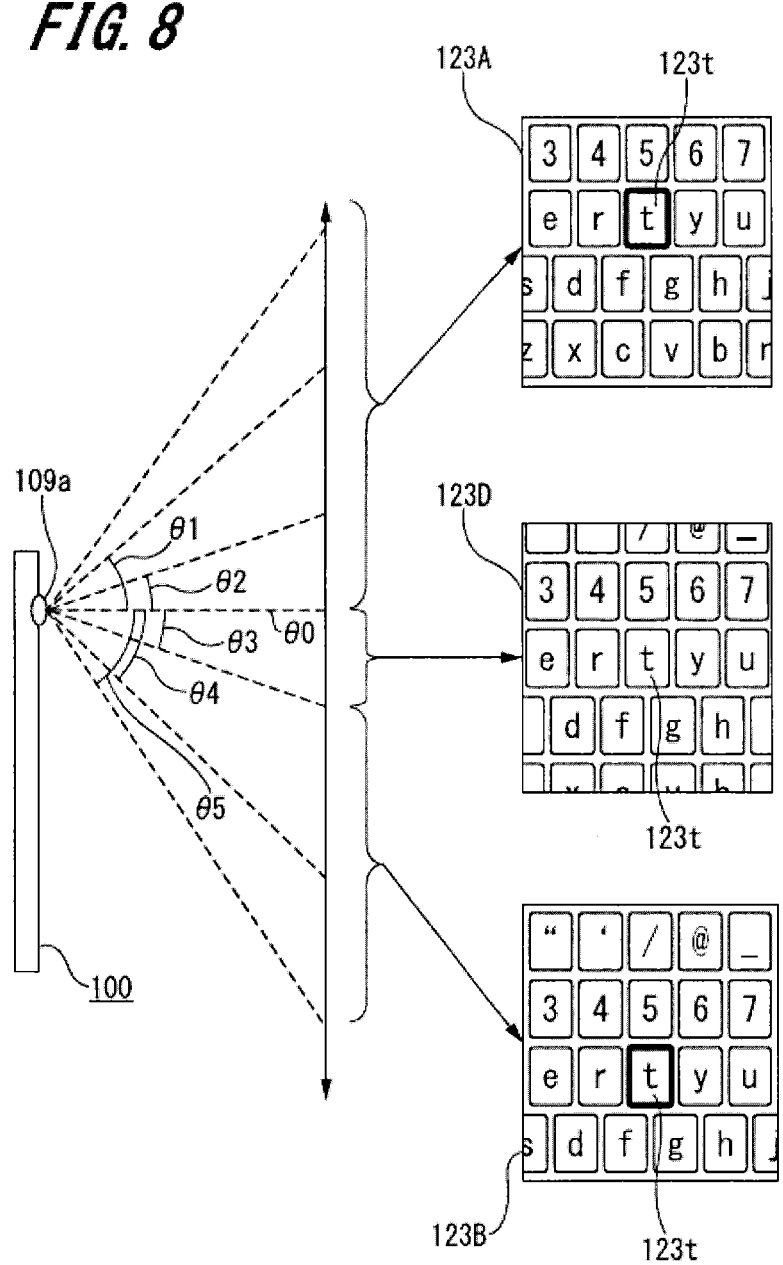
FIG. 8 illustrates an exemplary enlarged display area that changes based on a changes in a line-of-sight angle in a captured image.

Aspects of the present disclosure may be performed in real-time and/or with continuous adjustments of the enlarged display area. For example, aspects of enlarging a display area based on a line-of-sight angle calculated from a captured image may be executed continuously as the position of the image feature corresponding to the line-of-sight angle changes within an image/video. As a non-limiting example, FIG. 8 illustrates determining an enlarged display area based on a proximity detection of an instruction object and the calculation of a line-of-sight angle, whereby the enlarged area is changed based on changes in the detected line-of-sight angle. FIG. 8 assumes that line-of-sight angle θ3 provides a reference position/angle within which a display area shift does not occur. In this example, an instruction object is detected within a predetermined proximity of the character 123t, and a line-of-sight angle θ3 is calculated based on features of a captured image (e.g., eye position), resulting in an enlarged area 123D being displayed on the display 120. As shown in FIG. 8, the enlarged area 123D includes the character 123t at a substantially center position within the enlarged area. In response to detecting a change in line-of-sight angle from angle θ3 to angle θ1, the controller 110 causes the display 120 to display enlarged area 123A, which includes the character 123t shifted slightly above the position at which proximity detection occurs. Next, in response to detecting a change in line-of-sight angle from angle θ1 to angle θ5, the controller 110 adjusts the enlarged area to display enlarged area 123B, which includes the character 123t shifted slight below the position at which proximity detection occurs.

Aspects of the display area enlargement features described herein may be adapted such that the enlarged display area is determined based on a range of calculated line-of-sight angles. For example, referring to FIG. 8, the enlarged area 123A may be displayed when the calculated line-of-sight angle is between θ0 and θ1. Alternatively, a display area may be determined such that the center of the enlarged area is offset from a position at which a proximity detection occurs, whereby the degree to which the enlarged area is offset is directly proportional to the calculated line-of-sight angle.

Aspects of the display area enlargement features described in the present disclosure have been discussed thus far as relating to enlarging a portion of a virtual keyboard. However, it should be appreciated that the display area enlargement features of the present disclosure are not limited to enlarging an area of a virtual keyboard. In particular, aspects of the display enlargement features described in the present disclosure may easily be adapted such that a portion of, e.g., a web page, a document, an image, or the like, is enlarged based on a proximity detection and a calculation of a line-of-sight angle from a captured image. As a non-limiting example, FIGS. 9A and 9B illustrate a case in which a portion of a web page search result is enlarged and shifted based on a proximity detection and a determination of a line-of-sight angle.

Figure 9A:
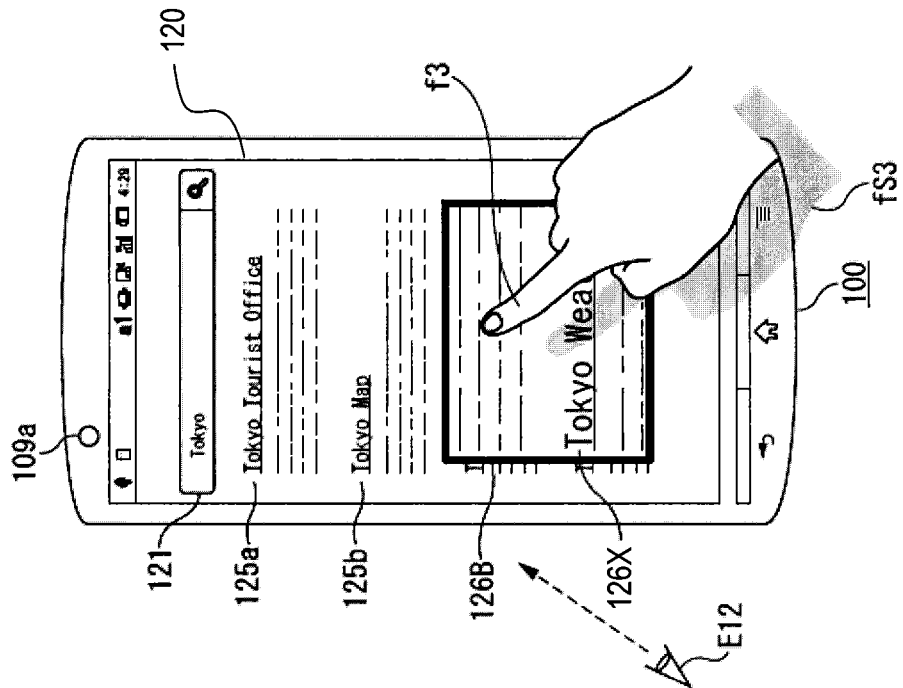
FIGS. 9A and 9B illustrate an exemplary case in which a portion of a web page search result is enlarged based on a determination of a line-of-sight angle in a captured image.

Referring first to FIG. 9A, FIG. 9A illustrates a web search display shown on the mobile device 100 from a downward perspective of eye E11. In particular, a key word search corresponding to a character string entered in search area 121 results in search results 125A, 125B, and 125X being displayed on the display 120. In response to the finger f2 approaching within a predetermined distance of the display 120, an enlarged area 126A that includes the search result 126X is shown on the display 120. The enlarged area 126A is determined based on the line-of-sight angle calculated from an image captured by the lens 109a, and corresponds to the eye E11 in the captured image. The example of FIG. 9A assumes that light is incident upon the mobile device 100 at a perpendicular angle resulting in the shadow fS2 being cast on the mobile device 100. As shown in the figure, the search result 126X is shifted to a slightly higher position relative to the position at which the proximity detection occurs (i.e., search result 126X). The upward shift in the search result 126X is caused by the controller 110 detecting a line-of-sight angle corresponding to the downward perspective of the eye E11.

Figure 9B:
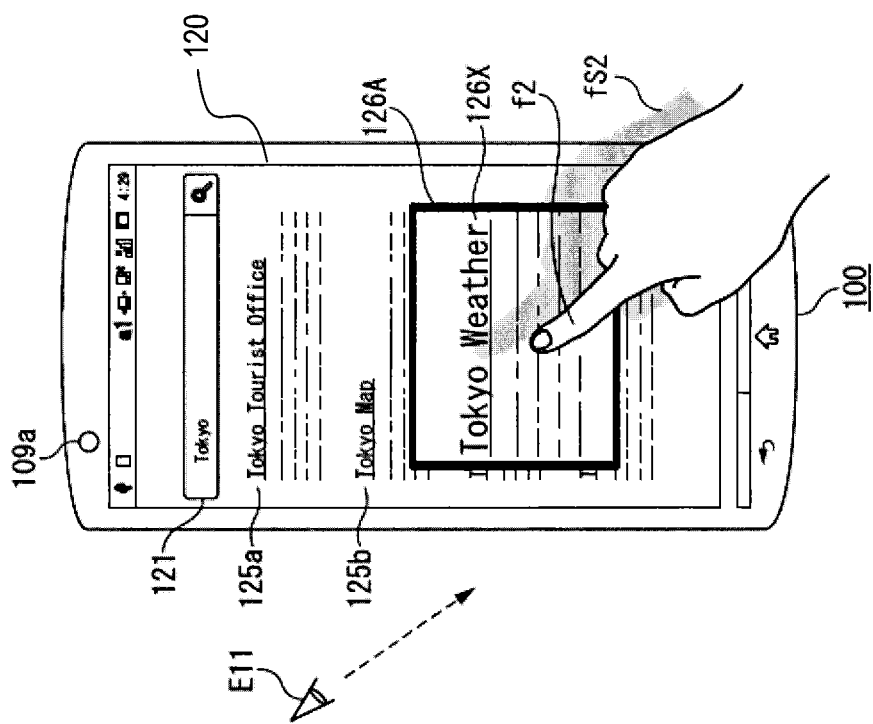

Similarly, FIG. 9B illustrates the mobile device 100 from an upward perspective of eye E12. The example of FIG. 9B assumes finger f3 approaches the search result 126X within a predetermined distance, and an image captured by the lens 109a includes the eye E12, whereby the controller 110 calculates a line-of-sight angle corresponding to the eye E12. Based on the calculated line-of-sight angle of the eye E12 in the captured image, the search result 126X is shifted slightly downward from the position at which proximity detection occurs. The shifting of the search result 126X mitigates the obscuring of display data beneath the instruction object (i.e., finger F3), which improves user friendliness.

The foregoing non-limiting examples are presented merely for illustration purposes and should not be construed as limiting. It should be appreciated that aspects of the present disclosure may be adapted such that display area enlargement features are performed using devices displaying other information aside from virtual keyboards and search results. Moreover, the display enlargement features may be adapted such that dimensional and orientation features of the enlarged area are different than those disclosed in the foregoing examples. Additionally, while the examples discuss the case in which an enlarged area is shifted upwards or downwards in response to detecting a line-of-sight angle in a captured image, it should be appreciated that the present disclosure may be adapted such that features of an enlarged display area may be shifted leftward or rightward in response to detecting a line-of-sight angle to be the left or right of the mobile device. Further, features of a captured image other than a user's eyes may be used to calculate a line-of-sight angle. For example, other facial features or image features may be used to calculate a line-of-sight angle. Additionally, rather than "shifting" an enlarged area of a predetermined size based on a calculated line-of-sight angle, aspects of the present disclosure may be adapted such that the enlarged area is expanded on one or more sides based on the calculated line-of-sight angle. Moreover, an enlarged display area may be centered, e.g., at a position corresponding to a proximity detection, and the enlarged display area may be overlayed on a display such that the center of the enlarged area is offset from the position at which the proximity detection occurs. Further, aspects of the present disclosure are not limited to enlarging a display area based on a proximity detection. For example, an enlarged area may be determined based on a line-of-sight angle and a detected touch operation on a display.

Obviously, numerous modifications and variations of the present disclosure are possible in light of the above teachings. It is therefore to be understood that within the scope of the appended claims, the invention may be practiced otherwise than as specifically described herein. For example, advantageous results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits configured to execute program code and/or computer instructions to execute the functions, processes and algorithms described herein.

Additionally, some implementations may be performed on modules or hardware not identical to those described. For example, aspects of the present disclosure may be adapted to be performed on a desktop computer, a laptop computer, a tablet computer, a television, a gaming system, or the like. Accordingly, other implementations are within the scope that may be claimed.

The functions and features described herein may also be executed by various distributed components of a system. For example, one or more processors may execute these system functions, wherein the processors are distributed across multiple components communicating in a network. The distributed components may include one or more client and/or server machines, in addition to various human interface and/or communication devices (e.g., display monitors, smart phones, tablets, personal digital assistants (PDAs)). The network may be a private network, such as a LAN or WAN, or may be a public network, such as the Internet. Input to the system may be received via direct user input and/or received remotely either in real-time or as a batch process.

It must be noted that, as used in the specification and the appended claims, the singular forms "a," "an," and "the" include plural referents unless the context clearly dictates otherwise.

The above disclosure also encompasses the embodiments noted below.

(1) An apparatus comprising circuitry configured to: determine, as a first determination result based on an output of a sensor, that an instruction object is within a predetermined distance of a surface of a display; acquire an image of an area surrounding the apparatus; detect a presence of a facial feature in the captured image; calculate a line-of-sight angle based on the detected facial feature; and control the display to enlarge an area of a displayed interface based on the first determination result and the line-of-sight calculation.

(2) The apparatus of (1), wherein the circuitry is configured to: determine a position on the display surface corresponding to the first determination result, and control the display to display the enlarged area offset from the position corresponding to the first determination result.

(3) The apparatus of (1) or (2), wherein the circuitry is configured to control the display to display the enlarged area offset from the position corresponding to the first determination result based on the calculated line-of-sight angle.

(4) The apparatus of any one of (1) to (3), wherein the circuitry is configured to control the display to display the enlarged area offset from the position corresponding to the first determination result based on a vector starting at a reference vector projecting perpendicularly from the display at the position corresponding to the first determination result and ending at a line-of-sight vector corresponding to the line-of-sight angle.

(5) The apparatus of any one of (1) to (4), wherein the circuitry is configured to control the display to display the enlarged area offset upwards or downwards relative to the position corresponding to the first determination result based on the line-of-sight angle.

(6) The apparatus of any one of (1) to (5), wherein the circuitry is configured to: control the display to display the position corresponding to the first determination result within the enlarged area, and when the enlarged area is offset upwards, control the display to display the enlarged area such that a greater portion of the displayed interface is displayed above the position corresponding to the first determination result than below the position corresponding to the first determination result.

(7) The apparatus of any one of (1) to (6), wherein the circuitry is configured to: control the display to display the position corresponding to the first determination result within the enlarged area, and when the enlarged area is offset downwards, control the display to display the enlarged area such that a greater portion of the displayed interface is displayed below the position corresponding to the first determination result than above the position corresponding to the first determination result.

(8) The apparatus of any one of (1) to (7), wherein: a vector projecting from the display surface perpendicular to the position corresponding to the first determination result defines a reference vector, and the circuitry is configured to: compare a line-of-sight vector corresponding to the line-of-sight angle to the reference vector, when the line-of-sight angle is above the reference vector, control the display to display the enlarged area offset above the position corresponding to the first determination result, and when the line-of-sight angle is below the reference vector, control the display to display the enlarged area offset below the position corresponding to the first determination result.

(9) The apparatus of any one of (1) to (8), wherein: a vector projecting from the display perpendicular to the position corresponding to the first determination result defines a reference vector, and the circuitry is configured to: compare a line-of-sight vector corresponding to the line-of-sight angle to the reference vector, when the line-of-sight vector is within a predetermined angle of the reference vector, control the display to display the enlarged area such that a center of the enlarged area corresponds with the position corresponding to the first determination result.

(10) The apparatus of any one of (1) to (9), wherein: the interface includes a virtual keyboard, and when the position corresponding to the first determination result corresponds to a key included in the virtual keyboard, the circuitry is configured to control the display to display the enlarged area such that the enlarged area includes the key and a predetermined area surrounding the key.

(11) A method comprising: displaying an interface on a display; determining, as a first determination result by a sensor, when an instruction object is within a predetermined distance from a surface of the display; acquiring an image of an area surrounding the apparatus; detecting, by circuitry, a presence of a facial feature in the captured image; calculating, by the circuitry, a line-of-sight angle based on the detected facial feature; and controlling, by the circuitry, the display to enlarge an area of a displayed interface based on the first determination result and the line-of-sight calculation.

(12) The method of (11), further comprising: determining, by the circuitry, a position on the display surface corresponding to the first determination result; and controlling, by the circuitry, the display to display the enlarged area offset from a position corresponding to the first determination result.

(13) The method of (11) or (12), further comprising controlling, by the circuitry, the display to display the enlarged area offset from the position corresponding to the first determination result based on the calculated line-of-sight angle.

(14) The method of any one of (11) to (13), further comprising controlling, by the circuitry, the display to display the enlarged area offset from the position corresponding to the first determination result based on a vector starting at a reference vector projecting perpendicularly from the display at the position corresponding to the first determination result and ending at a line-of-sight vector corresponding to the line-of-sight angle.

(15) The method of any one of (11) to (14), further comprising controlling, by the circuitry, the display to display the enlarged area offset upwards or downwards relative to the position corresponding to the first determination result based on the line-of-sight angle.

(16) The method of any one of (11) to (15), further comprising: controlling, by the circuitry, the display to display the position corresponding to the first determination result within the enlarged area; when the enlarged area is offset upwards, controlling, by the circuitry, the display to display the enlarged area such that a greater portion of the displayed interface is displayed above the position corresponding to the first determination result than below the position corresponding to the first determination result, and when the enlarged area is offset downwards, controlling, by the circuitry, the display to display the enlarged area such that a greater portion of the displayed interface is displayed below the position corresponding to the first determination result than above the position corresponding to the first determination result.

(17) The method of any one of (11) to (16), further comprising: comparing, by the circuitry, a line-of-sight vector corresponding to the line-of-sight angle to a reference vector projecting from the display perpendicular to the position corresponding to the first determination result; when the line-of-sight angle is above the reference vector, controlling, by the circuitry, the display to display the enlarged area offset above the position corresponding to the first determination result; and when the line-of-sight angle is below the reference vector, controlling, by the circuitry, the display to display the enlarged area offset below the position corresponding to the first determination result.

(18) The method of any one of (11) to (17), further comprising: comparing, by the circuitry, a line-of-sight vector corresponding to the line-of-sight angle to a reference vector projecting from the display perpendicular to the position corresponding to the first determination result; when the line-of-sight vector is within a predetermined angle of the reference vector, controlling, by the circuitry, the display to display the enlarged area such that a center of the enlarged area corresponds with the position corresponding to the first determination result.

(19) The method of any one of (11) to (18), further comprising: controlling, by the circuitry, the display to display a virtual keyboard in the interface, and when the position corresponding to the first determination result corresponds to a key included in the virtual keyboard, controlling, by the circuitry, the display to display the enlarged area such that the enlarged area includes the key and a predetermined area surrounding the key.

(20) A non-transitory computer readable medium having instructions stored therein that when executed by one or more processors causes the one or more processors to perform a method comprising: displaying an interface on a display; determining, as a first determination result, when an instruction object is within a predetermined distance from a surface of the display; acquiring an image of an area surrounding the apparatus; detecting a presence of a facial feature in the captured image; calculating a line-of-sight angle based on the detected facial feature; and controlling the display to enlarge an area of a displayed interface based on the first determination result and the line-of-sight calculation.

The invention claimed is:

1. An apparatus comprising:
circuitry configured to:
  determine, as a first determination result based on an output of a sensor, that an instruction object is within a predetermined distance of a surface of a display;
  determine a position on the display corresponding to the first determination result;
  acquire an image of an area surrounding the apparatus;
  detect a presence of a facial feature in the captured image;
  calculate a line-of-sight angle based on the detected facial feature; and
  control the display to enlarge an area of a displayed interface and display the enlarged area offset from the position corresponding to the first determination result based on a distance between a reference vector projecting perpendicularly from the display at the position corresponding to the first determination result and a line-of-sight vector corresponding to the line-of-sight angle.

2. The apparatus of claim 1, wherein
the circuitry is configured to control the display to display the enlarged area offset upwards or downwards relative to the position corresponding to the first determination result based on the line-of-sight angle.

3. The apparatus of claim 2, wherein:
the circuitry is configured to:
  control the display to display the position corresponding to the first determination result within the enlarged area, and
  when the enlarged area is offset upwards, control the display to display the enlarged area such that a greater portion of the displayed interface is displayed above the position corresponding to the first determination result than below the position corresponding to the first determination result.

4. The apparatus of claim 2, wherein:
the circuitry is configured to:
  control the display to display the position corresponding to the first determination result within the enlarged area, and
  when the enlarged area is offset downwards, control the display to display the enlarged area such that a greater portion of the displayed interface is displayed below the position corresponding to the first determination result than above the position corresponding to the first determination result.

5. The apparatus of claim 1, wherein:

the interface includes a virtual keyboard, and when the position corresponding to the first determination result corresponds to a key included in the virtual keyboard, the circuitry is configured to control the display to display the enlarged area such that the enlarged area includes the key and a predetermined area surrounding the key.

6. An apparatus comprising:

circuitry configured to:

determine, as a first determination result based on an output of a sensor, that an instruction object is within a predetermined distance of a surface of a display;

determine a position on the display corresponding to the first determination result;

acquire an image of an area surrounding the apparatus;

detect a presence of a facial feature in the captured image;

calculate a line-of-sight angle based on the detected facial feature; and control the display to enlarge an area of a displayed interface based on the first determination result and the line-of-sight calculation, wherein a vector projecting from the display surface perpendicular to the position corresponding to the first determination result defines a reference vector, and the circuitry is configured to:

compare a line-of-sight vector corresponding to the line-of-sight angle to the reference vector, when the line-of-sight angle is above the reference vector, control the display to display the enlarged area offset above the position corresponding to the first determination result, and when the line-of-sight angle is below the reference vector, control the display to display the enlarged area offset below the position corresponding to the first determination result.

7. An apparatus comprising:

circuitry configured to:

determine, as a first determination result based on an output of a sensor, that an instruction object is within a predetermined distance of a surface of a display;

determine a position on the display corresponding to the first determination result;

acquire an image of an area surrounding the apparatus;

detect a presence of a facial feature in the captured image;

calculate a line-of-sight angle based on the detected facial feature; and control the display to enlarge an area of a displayed interface based on the first determination result and the line-of-sight calculation, wherein a vector projecting from the display perpendicular to the position corresponding to the first determination result defines a reference vector, and the circuitry is configured to:

compare a line-of-sight vector corresponding to the line-of-sight angle to the reference vector, when the line-of-sight vector is within a predetermined angle of the reference vector, control the display to display the enlarged area such that a center of the enlarged area corresponds with the position corresponding to the first determination result.

8. A method comprising:

displaying an interface on a display;

determining, as a first determination result by a sensor, when an instruction object is within a predetermined distance from a surface of the display;

determining, by the circuitry, a position on the display surface corresponding to the first determination result;

acquiring an image of an area surrounding the apparatus;

detecting, by circuitry, a presence of a facial feature in the captured image;

calculating, by the circuitry, a line-of-sight angle based on the detected facial feature; and controlling, by the circuitry, the display to enlarge an area of a displayed interface and display the enlarged area offset from the position corresponding to the first determination result based on a distance between a reference vector projecting perpendicularly from the display at the position corresponding to the first determination result and a line-of-sight vector corresponding to the line-of-sight angle.

9. The method of claim 8, further comprising:

controlling, by the circuitry, the display to display the enlarged area offset upwards or downwards relative to the position corresponding to the first determination result based on the line-of-sight angle.

10. The method of claim 9, further comprising:

controlling, by the circuitry, the display to display the position corresponding to the first determination result within the enlarged area;

when the enlarged area is offset upwards, controlling, by the circuitry, the display to display the enlarged area such that a greater portion of the displayed interface is displayed above the position corresponding to the first determination result than below the position corresponding to the first determination result, and when the enlarged area is offset downwards, controlling, by the circuitry, the display to display the enlarged area such that a greater portion of the displayed interface is displayed below the position corresponding to the first determination result than above the position corresponding to the first determination result.

11. The method of claim 8, further comprising:

controlling, by the circuitry, the display to display a virtual keyboard in the interface, and when the position corresponding to the first determination result corresponds to a key included in the virtual keyboard, controlling, by the circuitry, the display to display the enlarged area such that the enlarged area includes the key and a predetermined area surrounding the key.

12. A method comprising:

displaying an interface on a display;

determining, as a first determination result by a sensor, when an instruction object is within a predetermined distance from a surface of the display;

determining, by the circuitry, a position on the display surface corresponding to the first determination result;

acquiring an image of an area surrounding the apparatus;

detecting, by circuitry, a presence of a facial feature in the captured image;

calculating, by the circuitry, a line-of-sight angle based on the detected facial feature;

controlling, by the circuitry, the display to enlarge an area of a displayed interface based on the first determination result and the line-of-sight calculation;

comparing, by the circuitry, a line-of-sight vector corresponding to the line-of-sight angle to a reference vector projecting from the display perpendicular to the position corresponding to the first determination result;

when the line-of-sight angle is above the reference vector, controlling, by the circuitry, the display to display the enlarged area offset above the position corresponding to the first determination result; and when the line-of-sight angle is below the reference vector, controlling, by the circuitry, the display to display the enlarged area offset below the position corresponding to the first determination result.

13. A method comprising:

displaying an interface on a display;

determining, as a first determination result by a sensor, when an instruction object is within a predetermined distance from a surface of the display;

determining, by the circuitry, a position on the display surface corresponding to the first determination result;

acquiring an image of an area surrounding the apparatus;

detecting, by circuitry, a presence of a facial feature in the captured image;

calculating, by the circuitry, a line-of-sight angle based on the detected facial feature;

controlling, by the circuitry, the display to enlarge an area of a displayed interface based on the first determination result and the line-of-sight calculation;

comparing, by the circuitry, a line-of-sight vector corresponding to the line-of-sight angle to a reference vector projecting from the display perpendicular to the position corresponding to the first determination result;

when the line-of-sight vector is within a predetermined angle of the reference vector, controlling, by the circuitry, the display to display the enlarged area such that a center of the enlarged area corresponds with the position corresponding to the first determination result.

14. A non-transitory computer readable medium having instructions stored therein that when executed by one or more processors causes the one or more processors to perform a method comprising:

displaying an interface on a display;

determining, as a first determination result, when an instruction object is within a predetermined distance from a surface of the display;

acquiring an image of an area surrounding the apparatus;

detecting a presence of a facial feature in the captured image;

calculating a line-of-sight angle based on the detected facial feature; and controlling the display to enlarge an area of a displayed interface and display the enlarged area offset from the position corresponding to the first determination result based on a distance between a reference vector projecting perpendicularly from the display at the position corresponding to the first determination result and a line-of-sight vector corresponding to the line-of-sight angle.

* * * * *